Sept. 8, 1936.  W. A. SUITER  2,053,926
APPARATUS FOR MAKING ICE CREAM SUCKERS
Filed April 27, 1932
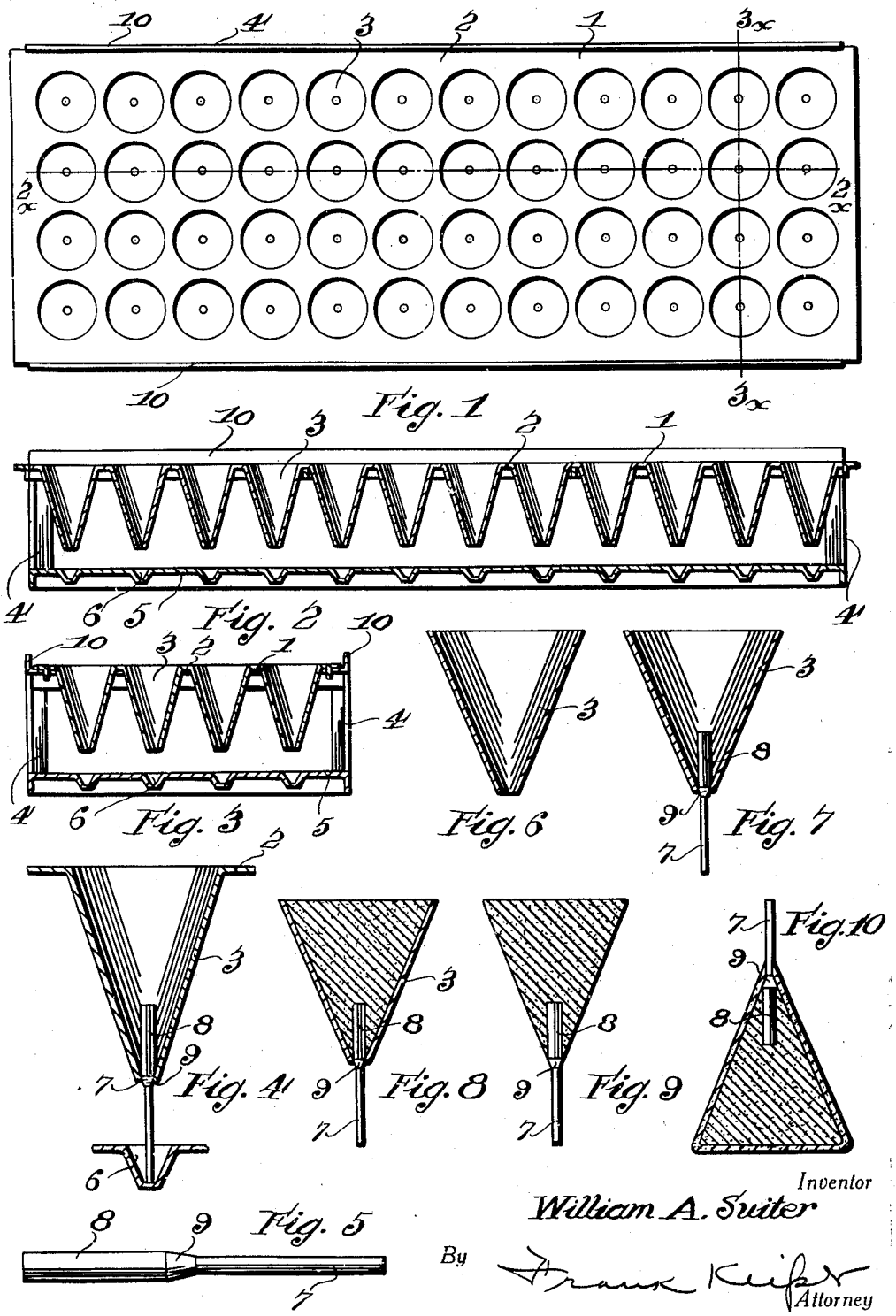
Inventor
William A. Suiter
By Frank Keifer
Attorney Patented Sept. 8, 1936

2,053,926

UNITED STATES PATENT OFFICE 2,053,926

APPARATUS FOR MAKING ICE CREAM SUCKERS

William A. Suiter, Rochester, N. Y., assignor, by direct and mesne assignments, of one-fourth to James Matheos and one-fourth to Christ Matheos, both of Spencerport, N. Y.

Application April 27, 1932, Serial No. 607,806

10 Claims. (Cl. 107—19)

The object of this invention is to provide an apparatus for making cone-shaped ice cream suckers.

Another object of the invention is to simplify and cheapen the making of ice cream suckers in which the ice cream is coated with a stiff chocolate coating.

This and other objects of the invention will be illustrated in the drawing, described in the specification and pointed out in the claims at the end thereof.

In the drawing:

Figure 1 is a top plan view of the gang of molds in which the ice cream cones are formed.

Figure 2 is a vertical longitudinal section on the line 2x 2x of Figure 1.

Figure 3 is a vertical transverse section on the line 3x 3x of Figure 1.

Figure 4 is a vertical section through one of the cone-shaped molds shown in Figure 2, showing a stick in place therein.

Figure 5 is a detail view of one of the sticks on which the sucker is mounted.

Figure 6 is a sectional view of one of the molds shown separately.

Figure 7 is a sectional view of the mold with the stick placed therein.

Figure 8 is a sectional view of the mold with the stick therein, the mold being filled with ice cream.

Figure 9 is a sectional view of the ice cream cone and stick removed from the mold.

Figure 10 is a sectional view of the ice cream cone and stick with the cone covered with a stiff chocolate coating.

In the drawing like reference numerals indicate like parts.

In the drawing in Figure 1 is shown an assembly or gang of molds, indicated by the reference numeral 1. This assembly consists of a plate 2 perforated with suitable round holes, in which are set the individual cone-shaped molds 3, the cone-shaped molds 3 being welded in place in the plate 2. After the assembly has been completed, as above described, it is tinned or otherwise suitably coated for sanitary effect.

A rack 4 is provided, which is adapted to hold the gang of molds shown in Figure 1, and this rack with a gang of molds set therein is shown in vertical longitudinal section in Figure 2 and in vertical transverse section in Figure 3. At the bottom of this rack is provided a centering pan 5 having little cups 6 therein for a purpose that will presently be described.

This rack and centering pan are attached to the base of the ice cream freezing machine.

In each one of the cone-shaped molds I place a wooden stick 7, such as is shown in Figure 5, the stick having a small lower end and an upper end 8 of larger diameter, the two parts being connected by a cone-shaped section 9.

One of these sticks is placed in each cone-shaped mold with the large end up, as is shown in Figures 4, 7 and 8. The tapered section of the stick is large enough to completely close the hole in the bottom of the cone-shaped mold, so that the ice cream will be securely held therein.

The cone-shaped mold with a stick in it is shown in Figure 7, and the centering cup in connection with the mold is shown in Figure 4. The object of the centering cup is to hold the stick in an exactly upright position in the mold.

The ice cream is now fed into the cone-shaped molds direct from the freezer, and when the gang of molds is filled, the surplus ice cream is removed by a suitable scraper which is passed over the top of the molds. To guide the scraper and hold it in line, the rack is provided with guides 10, 10 which also serve to keep the ice cream from flowing over. The gang of molds is then removed from the machine and placed in the hardening room where it is frozen quite solid.

In Figure 8 the ice cream is shown filled into the mold, with the ice cream ready to be frozen or in process of being frozen therein. When the ice cream is filled into the molds, it is preferably in a plastic condition. After the freezing has been completed, the ice cream cone with its stick is removed from the mold and is shown in Figure 9. In this figure the ice cream firmly engages the stick, and for all practical purposes, forms one part therewith.

In this condition the ice cream is ready to receive the chocolate coating, which is then applied thereto. For this purpose the cone is held by the small end of the stick 7 in an inverted position and dipped into the coating material which consists preferably of milk chocolate and cocoa butter, although other compositions can be used as well. This composition quickly cools and hardens and forms a case or a seal for keeping the ice cream in shape. These are then stored in a cold receptacle until it is desired to sell or eat them.

The small end of the stick serves as a handle for the finished product, and the handles are of uniform length.

Before the chocolate coating is hardened, the cone can be set in a pan of nut meats, preferably ground, in which case the nut meats will adhere thereto and form a part thereof, and will add to the attractiveness of the confection. Any other attractive confection etc. can be used instead of the nut meats for this purpose.

I claim:

1. In an apparatus for molding ice cream suckers, the combination of a plate having a plurality of round holes therein, cone-shaped molds attached to the under side of said plate with the large end up and open, each mold being concentric with one of the holes in said plate, each of said molds having a small opening in the bottom thereof, a stick having a large cylindrical section at one end and a small cylindrical section at the other end connected by a short cone-shaped section, one of said sticks being placed in each of said molds from above with the large end up and with the cone-shaped section in the small opening to close said opening from above, said plate being adapted to receive plastic ice cream thereon from which it runs into the molds to fill the molds, said molds and said sticks being adapted to hold the ice cream therein while it is being frozen around the upper ends of the sticks, said molds permitting the removal of the frozen cones of ice cream and the sticks through the upper ends of the molds.

2. An apparatus for molding ice cream suckers comprising a filling rack having inwardly extending flanges thereon near the top thereof, a plate in the bottom thereof having centering cups formed therein, a tray having a plurality of round holes therein with a cone-shaped mold fastened immediately under each of said holes, each mold having the large end open at the top and having the small end at the bottom with a small opening in the bottom of the mold, a stick having a large cylindrical section at one end and a small cylindrical section at the other end connected by a short cone-shaped section, said stick being placed in each of said receptacles from above with the large end up and the cone-shaped section in said opening to close said opening from above and the small end in a centering cup, said tray being supported on said flanges and being adapted to receive partially frozen ice cream thereon for the purpose of filling said molds, said tray being capable of being removed from the filling rack and placed in a cold chamber for the purpose of freezing the ice cream in the molds.

3. In an apparatus for molding ice cream suckers, the combination of a tray having a plurality of openings therein, a plurality of cone-shaped receptacles fastened one in each of said openings, each cone-shaped receptacle having the large end at the top and open, and each having the small end at the bottom with a small opening at the bottom thereof, a stick having a large cylindrical section at one end and a small cylindrical section at the other end connected by a short cone-shaped section, said stick being placed in each of said receptacles from above with the large end up and the cone-shaped section in said opening to close said opening from above, said receptacle being adapted to receive ice cream in a plastic condition, and hold it therein while it is being frozen around the upper end of the stick, said frozen ice cream and stick being adapted to be removed from the receptacle for further treatment.

4. In an apparatus for molding ice cream suckers, the combination of a tray having a plurality of openings therein, a plurality of cone-shaped receptacles fastened one in each of said openings, each having the large end at the top and open, and each cone-shaped receptacle having the small end at the bottom with a small opening at the bottom thereof, a stick having a large cylindrical section at one end and a small cylindrical section at the other end connected by a short cone-shaped section, one of said sticks being placed in each of said receptacles from above with the large end up and the cone-shaped section in said opening to close said opening from above, a rack for supporting said cone-shaped receptacles in position to receive the ice cream fed therein, said receptacles being adapted to receive ice cream in a plastic condition and hold it therein while it is being frozen around the upper end of the stick, said receptacle permitting the removal of the frozen cone of ice cream and the stick.

5. In an apparatus for molding ice cream suckers, the combination of a tray having a plurality of openings therein, a plurality of cone-shaped receptacles fastened one in each of said openings, each receptacle having a small opening in the bottom thereof, a stick having a large cylindrical section at one end and a small cylindrical section at the other end connected by a short cone-shaped section, said stick being placed in said receptacle from above with the large end up and the cone-shaped portion in said opening to close said opening from above, a centering pan placed below said cone-shaped receptacle, said pan having a series of cup-shaped recesses therein adapted to engage the lower end of said sticks and hold them in an upright position.

6. In an apparatus for molding ice cream suckers, the combination of a tray having a plurality of openings therein, a plurality of cone-shaped receptacles fastened one in each of said openings, each receptacle having a small opening in the bottom thereof, a stick having a large cylindrical section at one end and a small cylindrical section at the other end connected by a short cone-shaped section, said stick being placed in said receptacle from above with the large end up and the cone-shaped section in said opening to close said opening from above, a rack adapted to hold said receptacles in position to receive plastic ice cream therein.

7. A solid stick for an ice cream sucker having a cylindrical section of large diameter at one end and a cylindrical section of small diameter at the other end, connected by a short cone-shaped section, said stick being adapted to be placed from above in a cone-shaped receptacle having a small opening in the bottom thereof to temporarily close said opening.

8. A solid stick having a cone-shaped enlargement intermediate the ends thereof, one end of said stick being adapted to be frozen into a block of ice cream, the other end of said stick being adapted to serve as a handle for the ice cream frozen on the stick, said stick being adapted to be placed from above in a cone-shaped receptacle having a small opening in the bottom thereof to temporarily close said opening.

9. A solid stick for an icre cream sucker having a cylindrical section of large diameter at one end, and a cylindrical section of small diameter at the other end, connected by a short cone-shaped section, said stick being adapted to be placed from above in a cone-shaped receptacle having a small opening in the bottom thereof to temporarily close said opening.

10. In an apparatus for molding ice cream suckers, the combination of a tray having a plurality of openings therein, a plurality of cone-shaped receptacles fastened one in each of said openings, each receptacle having a small opening in the bottom thereof, a stick having a large cylindrical section at one end and a small cylindrical section at the other end connected by a short cone-shaped section, said stick being placed in said receptacle from above with the large end up and the cone-shaped portion in said opening to close said opening from above, means for holding said stick in an upright position in said cone-shaped receptacle.

WILLIAM A. SUITER.